R. O. STEFFEN.
WOODWORKING MACHINE.
APPLICATION FILED OCT. 4, 1918.

1,300,892.

Patented Apr. 15, 1919.
5 SHEETS—SHEET 1.

WITNESSES
Geo. Walling
N. P. Collamer

Inventor
Robert O Steffen
By
Richard P. Llwen,
Attorney

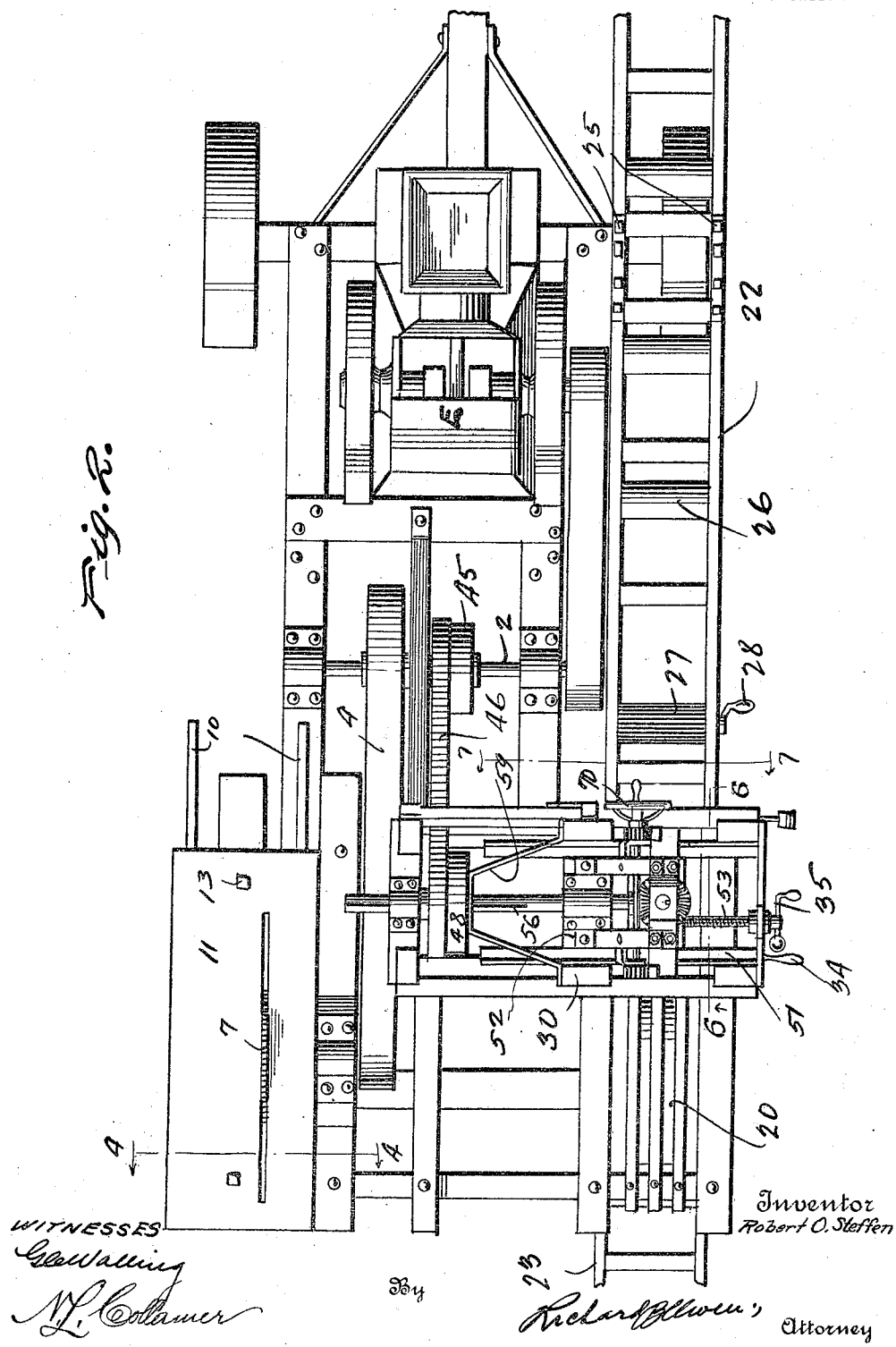

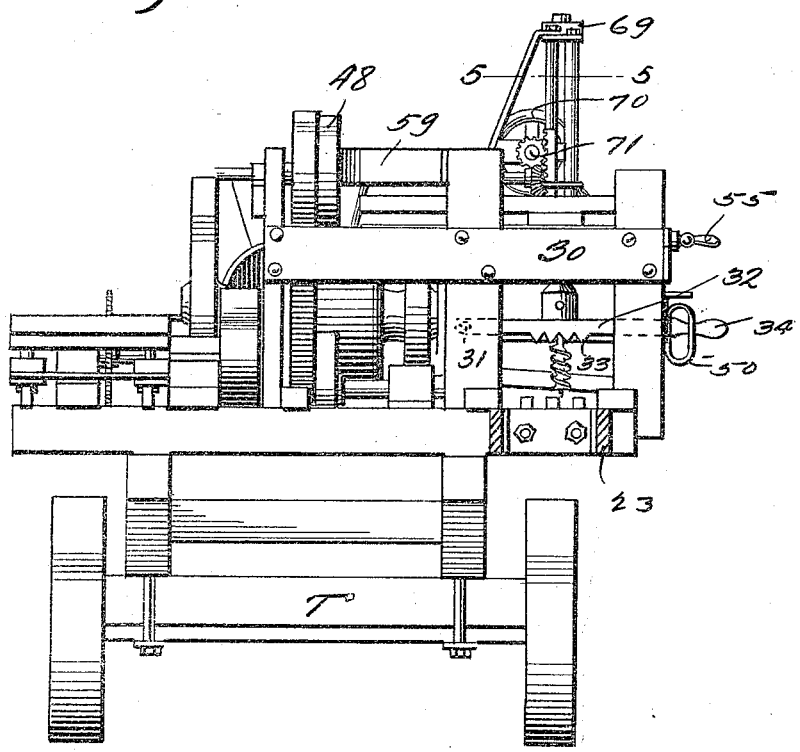

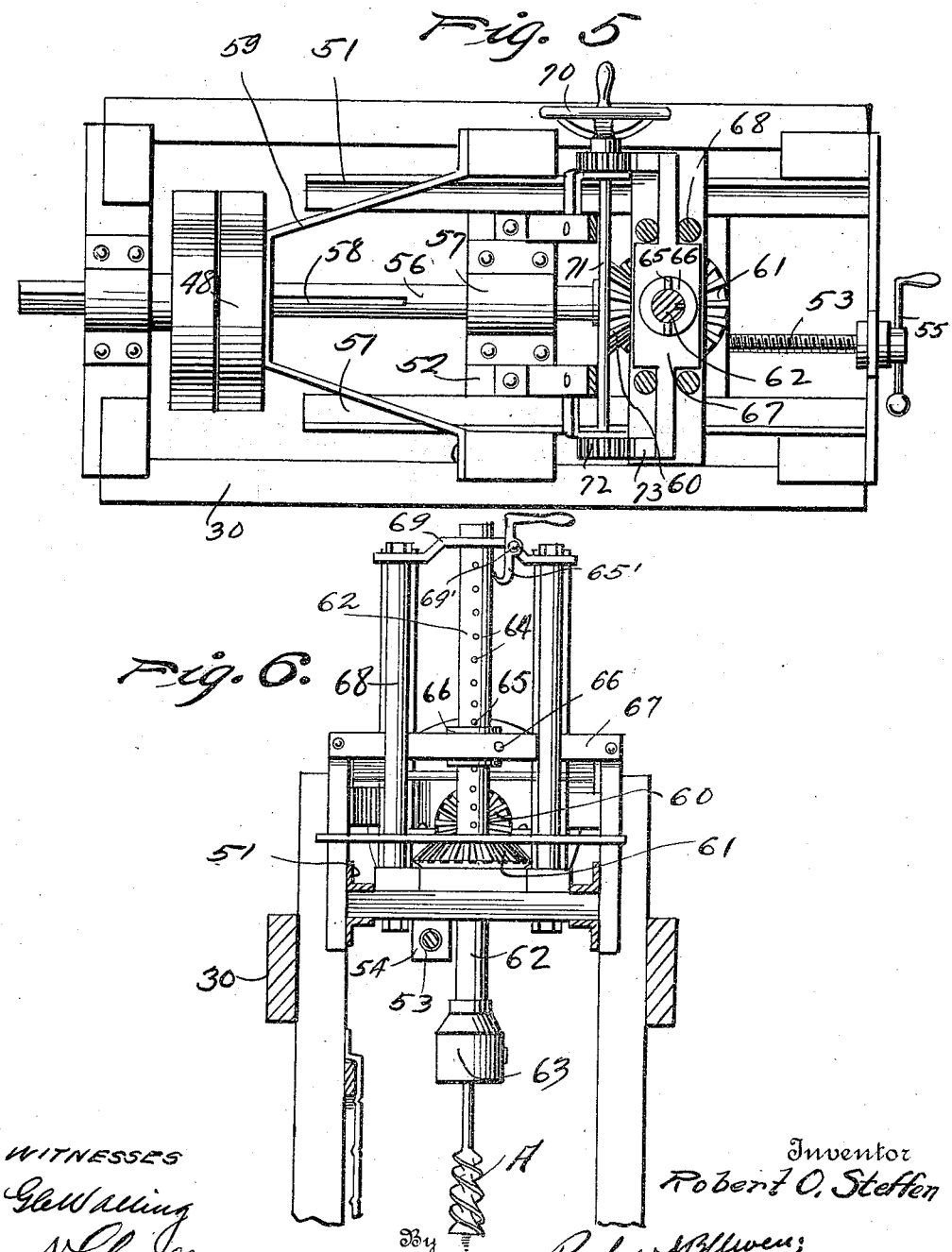

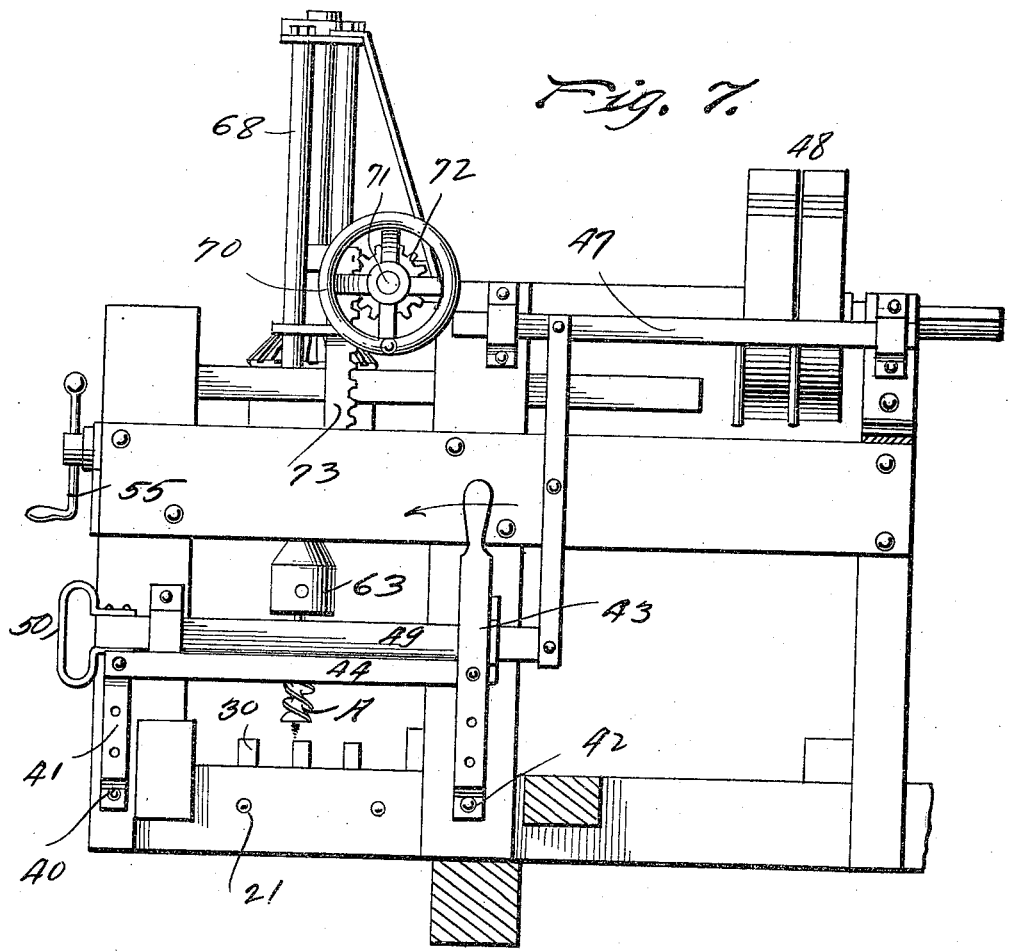
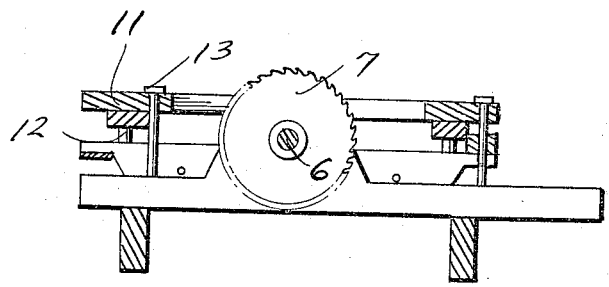

UNITED STATES PATENT OFFICE.

ROBERT O. STEFFEN, OF ELROY, WISCONSIN.

WOODWORKING-MACHINE.

1,300,892. Specification of Letters Patent. Patented Apr. 15, 1919.

Application filed October 4, 1918. Serial No. 256,851.

*To all whom it may concern:*

Be it known that I, ROBERT O. STEFFEN, a citizen of the United States, residing at Elroy, in the county of Juneau and State of Wisconsin, have invented certain new and useful Improvements in Woodworking-Machines, of which the following is a specification.

This invention is a wood working machine designed more particularly to produce framing timbers for barns and other structures, although by reason of the fact that it combines a sawing mechanism and a boring mechanism, it is quite possible to use the machine for doing work for a variety of purposes.

The primary idea of the invention is the production of a wood working machine which is entirely portable, because it is mounted on a wheeled base and can be drawn from point to point by a team or tractor, or in fact might be moved from point to point by its own power. For generating power, I preferably make use of a small gasolene engine mounted on a truck, although I do not wish to be limited with respect to the power used. I find it easier in this day of light motors to move the machine to the logs or materials to be worked, than it is to move them to the machine, and obviously it is not a difficult matter to transport the finished work to the point of use.

The invention comprises details of structure with respect to its sawing mechanism and its drilling mechanism so that one operator can stand at either side of the machine and do either class of work or two operators could do both classes of work simultaneously. The following specification sets forth the preferred construction of my machine, reference being made to the drawings, wherein:—

Fig. 2 is a plan view,

Fig. 3 is a rear end elevation and a section of the carrier,

Fig. 4 is an enlarged cross section on the line 4—4 of Fig. 2,

Figure 1:
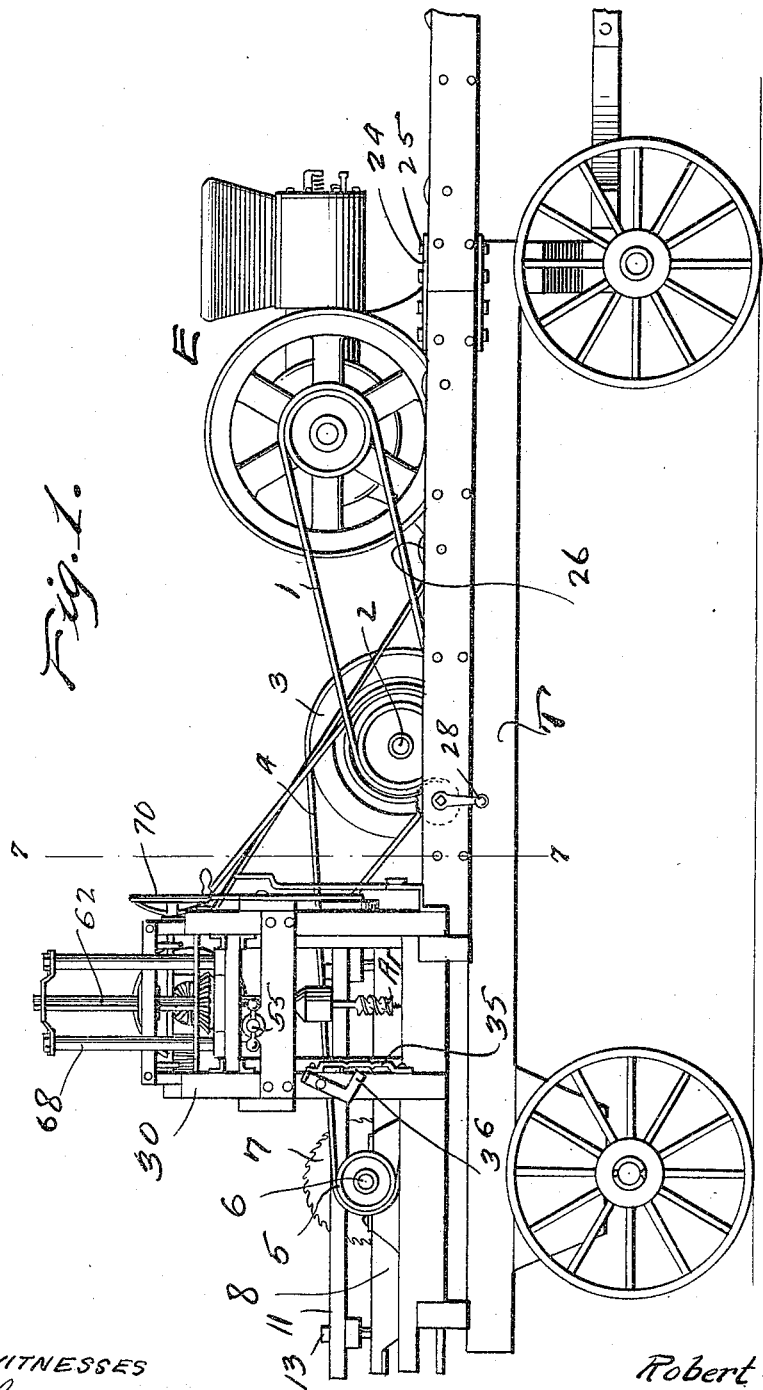
Figure 1 is a side elevation.

Fig. 5 is an enlarged horizontal sectional detail of the boring machanism on the line 5—5 of Fig. 3, Fig. 6 is a sectional elevation on the line 6—6 of Fig. 2, Fig. 7 is a section on the line 7—7 of Fig. 2, and Fig. 8 is a longitudinal sectional detail through the saw and its carriage.

The support herein shown is broadly designated by the letter T which indicates a truck mounted on wheels. The power unit is herein shown as a gasolene engine carried at the forward portion of the truck and broadly designated by the letter E. A belt 1 carries power from this engine to the main shaft 2, and a pulley 3 on this shaft is belted as at 4 to a pulley 5 on the shaft 6 of a circular saw 7 which stands at what might be called the rear side of the machine as seen in Fig. 1. The saw projects through a slot in a saw table, which table is made up of a base 8 having wheels 9 running on tracks 10, and a table top 11 having depending pins 12 movable vertically in sockets in said base so that the top can be adjusted downward or upward to expose more or less of the saw blade. Bolts 13 may be passed downward through the top and the base and into openings in the sub-structure so as to lock the saw table against movement, but when these bolts are withdrawn the table can be moved along its tracks by hand to feed the work to the saw in a manner which will be clear.

I have not thought necessary to show the dogs for holding logs on the table nor the gage employed when sawing slabs or boards from the log. I might here say that when this machine is employed working on material that has already been sawed out in the rough, it may be possible to dispense with the saw.

At what might be called the front side of the machine is a slatted table 20 whose end bars have pins 21 with which may be removably engaged the extremities of work carriers 22 and 23, the former intended to feed the work to the boring mechanism and the latter intended to carry it away. Each carrier comprising a framework which is shown in Fig. 1 as made up of two bars connected end to end by straps 24 and bolts or screws 25, and in the framework are rollers 26, one of those in the feed carrier numbered 27 having a crank handle 28 which may be turned to feed the work to the table 20 upon which it is to be bored. Details of the other carrier 23 are not illustrated. When the machine is not in use these carriers are detached from the pins 21 and reduced in length by taking out certain of the screws or bolts 25, and the carrier frames may all then be mounted on a truck and carried from point to point along with the rest of the machine.

Rising from the body of the truck is a skeleton framework broadly designated by the numeral 30 and in which a boring mechanism is mounted. Within this framework at 31 is pivoted a lever 32 having teeth 33 standing over the table. and when the lever is depressed by its handle 34 these teeth are sunk into the work and the lever is held down by a toothed guide 35. When this lever is not employed it is held raised by a catch 36. At the other side of the framework 30 there is pivoted thereto at 40 a link 41, and at 42 a lever 43. These two elements are pivotally connected by a cross bar 44 which is brought down onto the work when the lever is moved forward in the direction of the arrow in Fig. 7. Thus the toothed lever 32 and the swinging bar 44 act as work holders in coöperation with the work table 20. From a pulley 45 on the main shaft 2 a belt 46 leads upward through pins on a belt shifter 47 to fast and loose pulleys 48 as perhaps best seen in Fig. 7, and the belt shifter is connected with a sliding bar 49 whose handle 50 stands at the front side of the machine within reach of the operator thereof. Thus he has under his immediate control the feed of the work which is brought about by the crank handle 28, the clamping of the work controlled by the levers 32 and 43, and the starting and stopping of the boring mechanism through movements of the belt shifter by its handle 50.

Within the framework 30 is fixed a pair of tracks 51 on which is slidably mounted a carriage 52 which is caused to advance and recede by means of a screw 53 engaging a nut 54 on the carriage, the screw being swiveled in the front end of the framework and having a handle 55 within reach of the operator. A shaft 56 is mounted in a bearing 57 on the carriage and is feathered as at 58 through one of the pulleys 48, while the other is loose thereon as will be clearly understood. When the carriage is adjusted the shaft moves through the hubs of the pulleys, but the latter are prevented from longitudinal movement by means of a brace 59.

The front end of the shaft carries a miter gear 60 which is in constant mesh with a similar gear 61 splined on an upright shaft 62 which is mounted in appropriate bearings in said carriage and has a chuck 63 at its lower end carrying a tool or auger A. This shaft 62 is by preference provided with holes 64 into any of which may be inserted pins 65 above and below washers 66 which in turn stand above and below a cross head 67 mounted for vertical movement within a group of four upright rods or guides 68 rising from the carriage 52; and it is obvious that when this crosshead is raised or lowered the shaft 62 will be raised or lowered along with the auger or other tool A. In such movement the shaft 62 slides through the miter gear 61, and its upper end slides through a bearing in a spider 69 connecting the upper ends of the several guides 68.

Pivoted at 69' to the spider 69 is a lever 65' having a handle at one end and a hook at the other, and the hook may be swung into engagement with a pin 66' in one side of the cross head 67. This detail may be employed or not as preferred, but when used it is useful for holding the cross head and the auger raised without stopping the movement of the latter.

Vertical movement of the tool is brought about by means of a hand wheel 70 fast on a shaft 71 carrying gears 72 which mesh with rack bars 73 attached to the lateral ends of the cross head 67, and said hand wheel is also within reach of an operator standing at the front of the machine.

Having driven this machine to the point of use and placed the carriers 22 and 23 at opposite ends of the table 20 as shown in Fig. 2, one operator may well control the motor and the sawing mechanism and another operator the boring mechanism, while attendants bring up the logs or lumber and carry away the finished work. It will hardly be necessary to described how a log is converted into lumber by means of the saw. A beam is finally placed on the carrier 22 and fed by the roller 27 onto the table 20, where it is held by the teeth 33 of the lever 32 and by depression of the cross bar 44, or both. The carriage is then adjusted forward and backward to bring the auger over the point on the work where it is to be bored, the proper tool being inserted at A and the auger shaft adjusted by properly inserting the pins 65 in certain of the holes 64. Now the belt 46 is thrown on to the fast pulley and the shaft 56 rotates and turns the auger shaft, and by manipulating the hand wheel the crosshead is caused to descend so that the auger is fed downward into the work while it is rotating rapidly. Having done this boring, it is raised and perhaps advanced by turning the screw 53 by means of its handle 55 so that another hole can be bored. It is not necessary to go further into detail as to the boring of lumber or making framing timbers with this machine.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus fully described my invention what I claim as new and desire to secure by Letters Patent, is:—

1. In a boring machine, the combination with a work table, a skeleton framework rising therefrom, and horizontal tracks within said framework; of a carriage mounted on said tracks, a shaft journaled in the carriage and having a miter gear, a driving pulley splined on the shaft and connected with a source of power, means on the framework for holding the driving pulley when the shaft is adjusted through it, means for adjusting the carriage on the tracks, an upright auger shaft having a miter gear meshing with that mentioned, a tool at its lower end, and means for supporting said shaft in the carriage.

2. In a boring machine, the combination with a work table, a skeleton framework rising therefrom, and horizontal tracks within said framework; of a carriage mounted on said tracks, a shaft journaled in the carriage and having a miter gear, a driving pulley splined on the shaft and connected with a source of power, means on the framework for holding the driving pulley when the shaft is adjusted through it, means for adjusting the carriage on the tracks, an upright auger shaft, a miter gear splined thereon and meshing with that mentioned, a tool at the lower end of the shaft, and means for adjusting the shaft vertically through its miter gear and the carriage.

3. In a boring machine, the combination with a work table, a skeleton framework rising therefrom, and horizontal tracks within said framework; of a carriage mounted on said tracks, a shaft journaled in the carriage and having a miter gear, a driving pulley splined on the shaft and connected with a source of power, means on the framework for holding the driving pulley when the shaft is adjusted through it, means for adjusting the carriage on the tracks, an upright auger shaft, a miter gear splined thereon and meshing with that mentioned, a tool at the lower end of the shaft, a series of guides rising from said carriage, a crosshead movable in said guides and through which the auger shaft projects, said shaft having a longitudinal series of holes, pins selectively engaging said holes above and below the crosshead, and means for adjusting the crosshead vertically.

4. In a boring machine, the combination with a work table, a skeleton framework rising therefrom, and horizontal tracks within said framework; of a carriage mounted on said tracks, a shaft journaled in the carriage and having a miter gear, a driving pulley splined on the shaft and connected with a source of power, means on the framework for holding the driving pulley when the shaft is adjusted through it, means for adjusting the carriage on the tracks, an upright auger shaft, a miter gear splined thereon and meshing with that mentioned, a tool at the lower end of the shaft, a series of guides rising from said carriage, a crosshead movable in said guides and through which the auger shaft projects, said shaft having a longitudinal series of holes, pins selectively engaging said holes above and below the crosshead, rack bars depending from the extremities of said crosshead, a shaft mounted in the framework and having a hand wheel, and gears on the shaft engaging said rack bars for adjusting the crosshead vertically within its guides.

In testimony whereof I affix my signature in presence of two witnesses.

ROBERT O. STEFFEN.

Witnesses:
HOWARD B. BRUCE,
ARTHUR N. ELLIS.

Copies of this patent may be obtained for five cents each, by addressing the "Commissioner of Patents, Washington, D. C."